United States Patent
Shuster

(10) Patent No.: US 8,591,326 B2
(45) Date of Patent: *Nov. 26, 2013

(54) GUEST MANAGEMENT IN AN ONLINE MULTI-PLAYER VIRTUAL REALITY GAME

(76) Inventor: Gary Stephen Shuster, Fresno, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/460,602

(22) Filed: Apr. 30, 2012

(65) Prior Publication Data

US 2012/0220369 A1 Aug. 30, 2012

Related U.S. Application Data

(63) Continuation of application No. 12/332,149, filed on Dec. 10, 2008, now Pat. No. 8,167,724.

(60) Provisional application No. 61/012,688, filed on Dec. 10, 2007.

(51) Int. Cl.
*A63F 9/24* (2006.01)
*A63F 13/00* (2006.01)

(52) U.S. Cl.
USPC ......... 463/29; 463/8; 463/40; 463/42; 463/43

(58) Field of Classification Search
USPC .......................................... 463/29
See application file for complete search history.

(56) References Cited

U.S. PATENT DOCUMENTS

| | | | |
|---|---|---|---|
| 5,583,922 A * | 12/1996 | Davis et al. | 379/93.09 |
| 6,020,885 A * | 2/2000 | Honda | 715/757 |
| 6,219,045 B1 * | 4/2001 | Leahy et al. | 715/757 |
| 6,243,039 B1 * | 6/2001 | Elliot | 342/457 |
| 6,381,444 B1 * | 4/2002 | Aggarwal et al. | 434/350 |
| 6,545,682 B1 * | 4/2003 | Ventrella et al. | 345/473 |
| 6,699,125 B2 * | 3/2004 | Kirmse et al. | 463/42 |
| 6,762,733 B2 * | 7/2004 | Smith et al. | 345/2.2 |
| 6,767,287 B1 * | 7/2004 | Mcquaid et al. | 463/42 |
| 7,266,585 B2 * | 9/2007 | Kay et al. | 709/206 |
| 7,780,530 B2 * | 8/2010 | Ushiro et al. | 463/42 |
| 7,809,789 B2 * | 10/2010 | Shuster | 709/203 |
| 7,865,590 B2 * | 1/2011 | Zalewski | 709/224 |
| 7,913,176 B1 * | 3/2011 | Blattner et al. | 715/758 |
| 7,966,567 B2 * | 6/2011 | Abhyanker | 715/757 |
| 2001/0042126 A1 * | 11/2001 | Wong et al. | 709/229 |
| 2001/0051989 A1 * | 12/2001 | Moncreiff | 709/206 |
| 2002/0062348 A1 * | 5/2002 | Maehiro | 709/205 |
| 2003/0014524 A1 * | 1/2003 | Tormasov | 709/226 |
| 2003/0039945 A1 * | 2/2003 | Dang et al. | 434/118 |

(Continued)

*Primary Examiner* — Steven J Hylinski
(74) *Attorney, Agent, or Firm* — Novak Druce Connolly Bove + Quigg LLP; Jonathan Jaech

(57) ABSTRACT

A guest management method and system for an online multi-player virtual realty environment or social networking site. A network interface receives guest access requests from guest clients and input data from a plurality of remotely-located clients. The input data is operative to control avatars associated with the clients in a modeled virtual reality environment. A memory holds program instructions for determining whether the guest access is associated with a member client. If the guest access request is associated with the member client, then the guest client is allowed to access the virtual reality environment via a guest avatar. The guest avatar's movements in the virtual reality environment are restricted based on a location of a member avatar controlled by the associated member client. For example, the guest avatar may only be permitted to move within an area that is bounded by a perimeter about the member avatar.

23 Claims, 2 Drawing Sheets

(56) References Cited

U.S. PATENT DOCUMENTS

| | | | |
|---|---|---|---|
| 2003/0083922 A1* | 5/2003 | Reed | 705/9 |
| 2003/0139938 A1* | 7/2003 | Meyers | 705/1 |
| 2003/0151605 A1* | 8/2003 | Dominici | 345/419 |
| 2004/0015549 A1* | 1/2004 | Saruhashi et al. | 709/204 |
| 2004/0030781 A1* | 2/2004 | Etesse et al. | 709/225 |
| 2004/0235564 A1* | 11/2004 | Booth | 463/31 |
| 2004/0260753 A1* | 12/2004 | Regan | 709/200 |
| 2005/0009602 A1* | 1/2005 | Nishimura | 463/30 |
| 2005/0026692 A1* | 2/2005 | Dyl | 463/42 |
| 2005/0044005 A1* | 2/2005 | Giannini | 705/26 |
| 2005/0137015 A1* | 6/2005 | Rogers et al. | 463/42 |
| 2005/0228723 A1* | 10/2005 | Malik | 705/26 |
| 2005/0228876 A1* | 10/2005 | Malik | 709/223 |
| 2006/0031578 A1* | 2/2006 | Pelletier | 709/245 |
| 2006/0089873 A1* | 4/2006 | Stewart et al. | 705/14 |
| 2006/0119598 A1* | 6/2006 | Littlefield | 345/419 |
| 2006/0287072 A1* | 12/2006 | Walker et al. | 463/25 |
| 2007/0011273 A1* | 1/2007 | Greenstein et al. | 709/217 |
| 2007/0024613 A1* | 2/2007 | Jung et al. | 345/419 |
| 2007/0036287 A1* | 2/2007 | Campbell | 379/67.1 |
| 2007/0038559 A1* | 2/2007 | Jung et al. | 705/39 |
| 2007/0130339 A1* | 6/2007 | Alcorn et al. | 709/225 |
| 2007/0162547 A1* | 7/2007 | Ross | 709/204 |
| 2007/0168237 A1* | 7/2007 | Campbell | 705/5 |
| 2007/0202484 A1* | 8/2007 | Toombs et al. | 434/350 |
| 2007/0220090 A1* | 9/2007 | Hall | 709/204 |
| 2007/0224585 A1* | 9/2007 | Gerteis et al. | 434/350 |
| 2007/0249323 A1* | 10/2007 | Lee et al. | 455/411 |
| 2007/0255805 A1* | 11/2007 | Beams et al. | 709/218 |
| 2007/0276521 A1* | 11/2007 | Harris et al. | 700/91 |
| 2008/0046512 A1* | 2/2008 | Jones et al. | 709/204 |
| 2008/0064018 A1* | 3/2008 | Griffin | 434/322 |
| 2008/0080392 A1* | 4/2008 | Walsh et al. | 370/254 |
| 2008/0081701 A1* | 4/2008 | Shuster | 463/42 |
| 2008/0134056 A1* | 6/2008 | Shuster | 715/757 |
| 2008/0158232 A1* | 7/2008 | Shuster | 345/474 |
| 2008/0168553 A1* | 7/2008 | Kiehtreiber | 726/17 |
| 2008/0215994 A1* | 9/2008 | Harrison et al. | 715/757 |
| 2008/0275789 A1* | 11/2008 | Ganz et al. | 705/26 |
| 2008/0300055 A1* | 12/2008 | Lutnick et al. | 463/39 |
| 2009/0089157 A1* | 4/2009 | Narayanan | 705/14 |
| 2009/0098921 A1* | 4/2009 | Manning et al. | 463/17 |
| 2009/0106671 A1* | 4/2009 | Olson et al. | 715/757 |
| 2009/0113524 A1* | 4/2009 | Hamilton, II et al. | 726/4 |
| 2009/0150778 A1* | 6/2009 | Nicol, II | 715/706 |

* cited by examiner

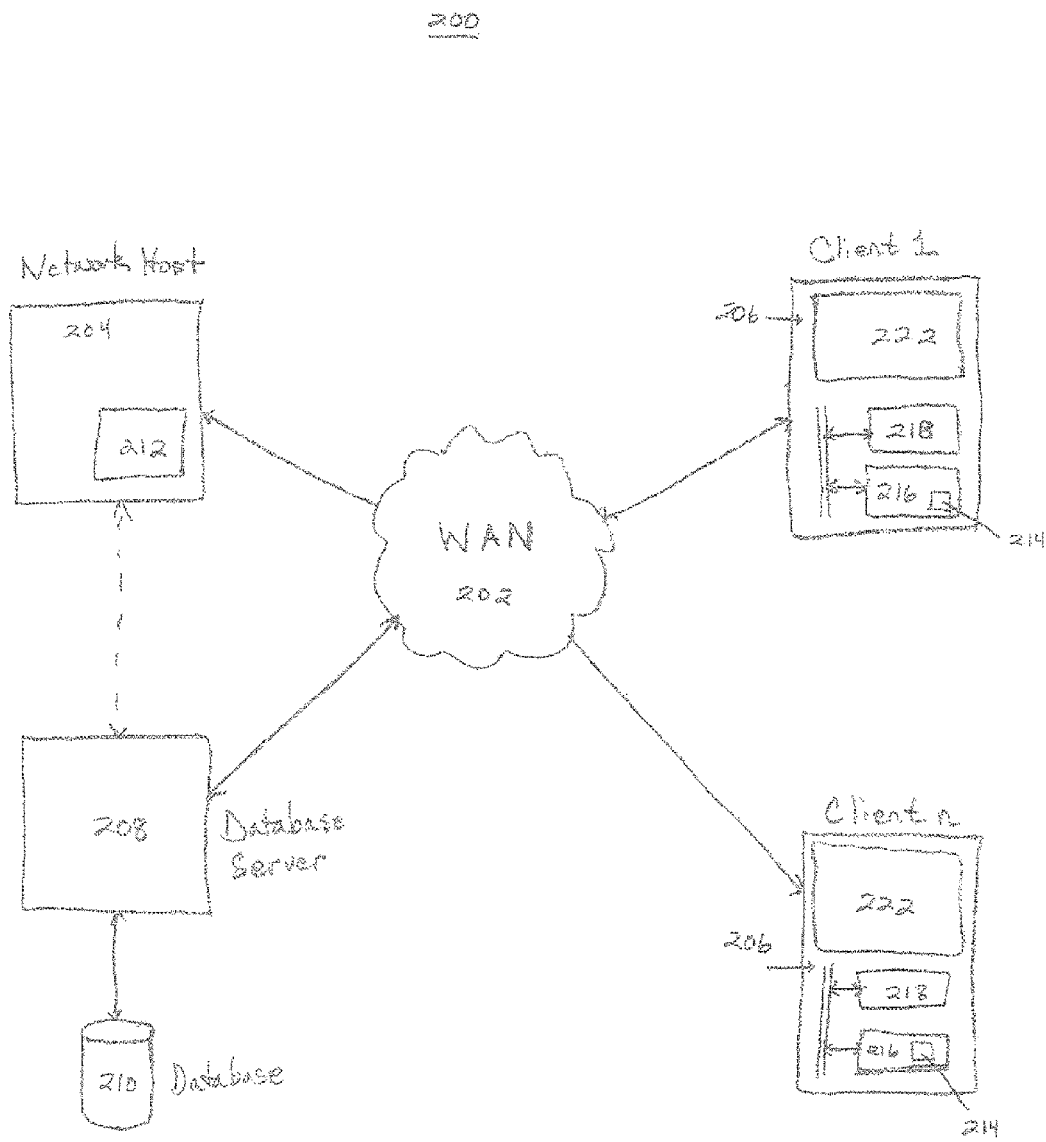

GUEST MANAGEMENT IN AN ONLINE MULTI-PLAYER VIRTUAL REALITY GAME

CROSS-REFERENCE TO RELATED APPLICATIONS

This application is a continuation of U.S. patent application Ser. No. 12/332,149 filed Dec. 10, 2008, now U.S. Pat. No. 8,167,724, which claims priority pursuant to 35 U.S.C. §119(e) to U.S. provisional application Ser. No. 61/012,688, filed Dec. 10, 2007, which are hereby incorporated by reference in their entireties.

BACKGROUND

1. Field of the Inventions

The present invention relates to multi-player virtual environments such as used in computer gaming, and in particular for guest management in an online multi-player virtual reality environment.

2. Description of Related Art

Various simulation games are known in which a 3-D physical world (actual or fantasy) is simulated. Games of this type are sometimes referred to as "virtual reality" or "virtual reality universe" (VRU) games. In known VRU games, an actual or fantasy universe is simulated within a computer memory. Multiple players may participate in a in the game through a computer network, such as a local area network or a wide area network. Each player selects an "avatar," often a three-dimensional figure of a man, woman, or other being, to represent them in the VRU environment. An "avatar" generally refers to an image representing a user in a multi-user virtual reality (VR) space, or VR-like space. Players send inputs to a VRU engine to move their avatars around the VRU environment, and are able to cause interaction between their avatars and objects in the VRU. For example, a player's avatar may interact with an automated entity or person, simulated static objects, or avatars operated by other players.

The VRU may take the form of at least one area or environment which is a virtual-reality three-dimensional map existing in a computer memory, consisting of elements that may include but are not limited to representations of rooms, outdoor areas, exotic environments, objects, people, animals, robots, avatars, robot avatars, time elements, additional spatial elements, and activities. Users establish a presence in the VRU by creating or using an avatar, which is a three-dimensional representative of the user in the VRU, and which can be navigated by the user around various environments in the VRU. A view or views of the VRU are displayed to the user using a client computer display and user interface software as known in the art. Each user provides input to a computer controlling the VRU using an input device connected to a local node or client, which is in turn connected to the networked computer system. The VRU is shared by all players and participants, using elements from the common memory.

Essentially, the computer system generates 3-D, real-time, transient animation of avatars and other objects that include responses to user inputs, such as move right, left, etc. For example, avatars may be limited to simply observing the environment or area. But usually, avatars can interact with some or all of: other avatars, objects, the environment (e.g., walls, floors, roads, lakes, etc.), and automated or robotic avatars within at least one environment. Interactions by one avatar with any other avatar, object, the environment or automated or robotic avatars may, in some cases, but need not, result in outcomes that may effect or otherwise be observed or experienced by other avatars, objects, the environment, and automated or robotic avatars within the at least one environment of the VRU.

The VRU may be accessible via the Internet through client programs. Often, entry into the VRU is limited to registered or paying members. This may, in certain instances, provide a barrier to entry into the VRU to those who are not familiar with the VRU environment. Thus, it may be desirable to provide the option of allowing guest access into the VRU environment. However, allowing unescorted guests without a vested interest in the integrity of the virtual environment—or without knowledge of the customs and practices in the virtual environment—might lead to reduced enjoyment for members.

SUMMARY

The present method and system provides for managing guest access into an online, multi-player VRU environment. Guest access is provided through existing members of the VRU by, for example, providing members a certain number of guest permits to share with non-members. Once a guest is permitted access into the VRU, the guest may be able to participate in the VRU environment through a guest avatar.

Because there exists the potential for abuse in having two users share a single membership (i.e., a paying or registered member and a guest), one or more limitations may be placed upon the guest's access into the VRU environment. For example, guest avatars may be associated with member avatars such that the guest avatar's movement is limited by the location of the member avatar in the VRU environment. This may be accomplished by, for example, setting a perimeter defining an area about the member avatar and requiring the guest avatar to stay within the defined area. Alternatively, the guest avatar may be permitted freedom of movement in the direction of a direct path to the member avatar. The freedom of movement may also be a defined area in angular relation with respect to the direct path (i.e., 30 degrees of the direct path of the member avatar).

If a guest avatar is found to have violated one or more of limitations by, for example, moving outside of a defined area about the member avatar, a warning may be displayed to the user controlling the guest avatar or the guest may be forcibly moved into the defined area. If the guest avatar repeatedly violates the limitations, guest access into the VRU may be terminated. Thus, the number of times that the guest avatar violates the one or more limitations may be tallied and recorded such that if the number exceeds a predetermined number, guest access is automatically terminated.

Alternatively, the guest avatar's movement may be limited such that the guest avatar is incapable of moving outside of a defined area bout the member avatar. In such an embodiment, the guest member cannot move the guest avatar outside of the defined area and therefore preventing violations of the limitations by the guest avatar.

In addition to limiting the guest avatar's movement relative to the location of the member avatar, the guest avatar may be subject to other limitations. For example, certain VRU functionality available to member avatars may not be available to guest avatars, such as, for example, instant messaging, chat, in-game mail, avatar facial expressions, gestures and other activity limitations. These limitations may help protect the integrity of the VRU environment.

In one preferred embodiment, a guest-management system in an online multiplayer virtual reality environment is provided. The guest-management system comprises a network interface disposed to receive a guest access request and input data from a plurality of remotely-located clients. The guest access request is for a guest client associated with a member client. The input data is operative to control avatars associated with the remotely-located clients in a modeled virtual reality environment. A memory holds program instructions operable for implementing the guest-management system. These instructions include determining whether the guest access request is associated with a member client, allowing the guest client to provide input data operative to at least control a guest avatar's movements in the modeled virtual reality environment if the guest access request is associated with the member client; and applying one or more restrictions on the guest avatar's movements based on a location of a member avatar controlled by the associated member client in the modeled virtual reality environment. The guest-management system further comprises a processor, in communication with the memory and the network interface, configured for operating the program instructions.

In another preferred embodiment, a computer-implemented method for providing guest management in an online multiplayer virtual reality environment is provided. The method comprises receiving input data operative to control one or more avatars in a multi-user modeled virtual reality environment, the avatars each being associated with a remotely-located client; receiving a guest access request for a guest client; determining whether the guest access request is associated with a member client; allowing the guest client to provide input data operative to control a guest avatar in the modeled virtual reality environment if the guest access request is associated with the member client; and applying restrictions on the guest avatar's movements based on a location of a member avatar of the associated member client in the virtual reality environment.

In a further preferred embodiment, a computer-readable media encoded with program instructions is provided. The program instructions are operative to cause a computer to perform the steps of receiving input data at a host from multiple remote clients for coordinating a multi-user virtual reality process; receiving a guest access request for a guest client; determining whether the guest access request is associated with a member client; allowing the guest client to provide input data operative to control a guest avatar in the modeled virtual reality environment if the guest access request is associated with the member client; and applying restrictions on the guest avatar's movements based on a location of a member avatar of the associated member client in the virtual reality environment.

A more complete understanding of the method and system for managing guest access into the VRU environment will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 2 is a block diagram illustrating an embodiment of an anti-collusive vote weighting system.

In the detailed description that follows, like element numerals are used to describe like elements appearing in one or more of the figures.

DETAILED DESCRIPTION OF VARIOUS EMBODIMENTS

Figure 1:
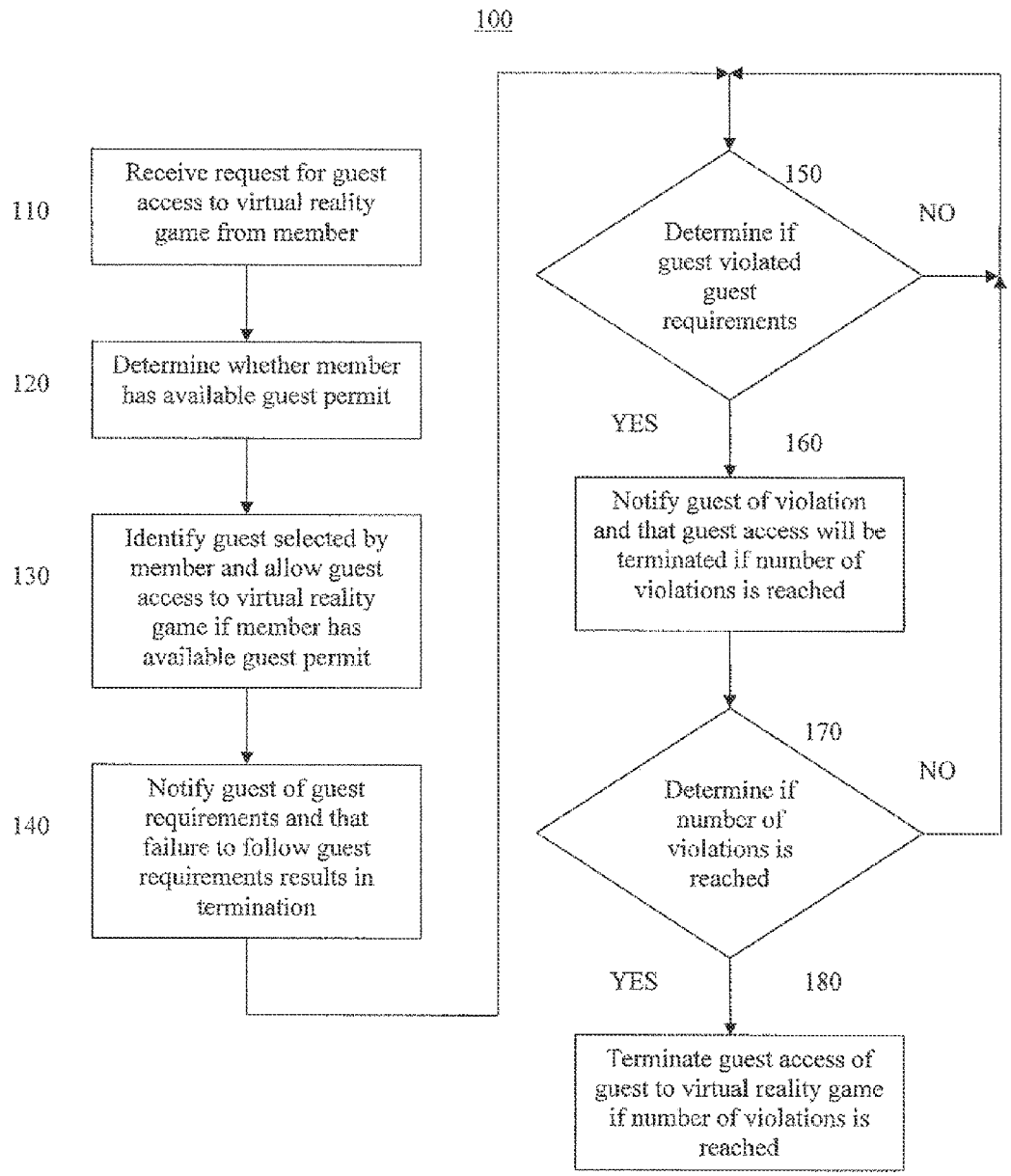
FIG. 1 is a flow diagram illustrating an embodiment of a method of anti-collusive vote weighting.

One of ordinary skill in the art will find that there are a variety of ways to design a client or server architecture. Therefore, the methods and systems disclosed herein are not limited to a specific client or server architecture. Methods and systems for animation control of multiple participants in a VRU are disclosed in commonly owned co-pending U.S. patent application Ser. No. 11/963,765, filed Dec. 21, 2007, which is incorporated herein by reference in its entirety.

FIG. 1 is a flow diagram illustrating an exemplary method 100 in accordance with the present disclosure. At step 110, a request for guest access to a virtual reality game is received from a guest or an associated member. The request may be for guest access to a social networking site or other multi-participant online and/or entertainment site. The member may be a paying or registered member of the VRU. The member may be given a number of guest passes to share with non-members who are interested in becoming members. The request for guest access may be received by a VRU server from a client operated by the requesting user. It should be appreciated that as part of an electronic environment provided via a client-server system to a plurality of users, transactions related to guest management will generally occur via the computer system hosting the VRU, and comprise an integrated part of the VRU environment.

At step 120, the VRU server may determine whether the member has an available guest permit. The virtual reality game and/or social networking site may limit the number of guest permits each member has for a predetermined time period. For example, a guest may be limited to one, two, or three guest permits at any one time, such that while all the allotted permits are in use, no further guests may be admitted. In the alternative, or in addition, guest permits may be configured such that each permit expires after it is used, and cannot be used again. If it is determined that the member has at least one available guest permit, then at step 130, the guest selected by the member is identified and allowed access to the VRU.

Alternatively, guest access into the VRU may be limited based on whether or not the guest is associated with a member client. Thus, guest access to the VRU may be conditioned upon the associated member being logged into the VRU. Therefore, the VRU server may deny guest access if the associated member is not logged into the VRU. In these embodiments, a guest permit may not be needed and the guest may simply log into a member client's account as a guest. For example, logging into the VRU may require a user to input a user ID and a password. Thus, the guest may access a member's account by inputting the member user ID and a separate different password reserved for guests. This allows both member and guest access into a single account while at the same time enabling the system server to differentiate the two users. Once a guest is allowed access into the VRU, the guest will be able to participate in the VRU through a guest avatar and to input data to control the movement of the guest avatar in the VRU.

At step 140, the guest is notified about guest requirements and that failure to follow the guest requirements may result in termination of guest privileges. The guest avatar is allowed freedom of movement in the VRU subject to certain restrictions. These restrictions may be tied to a location of a member avatar of the associated member client in the VRU. Thus, for example, as the member avatar moves in the VRU, the guest avatar may be required to move in the same direction. The limitations on the guest avatar's movements may be configured in any number of ways. For example, the guest requirements may comprise a perimeter limitation that limits the distance a guest avatar may be from its associated member avatar. The perimeter may be established around the member defining an area within which the guest must remain. The area may be a predetermined distance from the member in all directions, such as a circle, so as to closely associate the member with the guest. Alternatively, the guest avatar's movements may be restricted based on a direction of movement of the member avatar. For example, the guest avatar may be permitted to move within an area that is bounded by a predefined angle relative to the movement of the member avatar. Alternatively, the guest may be allowed the freedom of movement, but only in a certain direction, such as, for example, in the direction of a direct path to the member. As a further alternative, the guest may be able to move with some degree of variation permitted, such as within thirty degrees of the direct path to the member.

Because the member avatar may also be constantly moving around the VRU environment, it may be necessary to continuously recalculate the perimeter or boundary about the member avatar that defines the area within which the guest avatar is permitted freedom of movement. Additionally, it may be desirable to provide a status screen showing the relative locations of the member avatar and the guest avatar so that the guest may be able to ascertain and anticipate the boundaries within which the guest is allowed to move the guest avatar.

The guest requirements or restrictions may also include limitations on chat, instant messaging, in-game mail, gesture, facial expression and/or other activity limitations. The limitations may be tailored within the virtual reality game and/or networking site depending on various factors such as the level of access of the member, the area(s) in which the member is allowed, and the general requirements of every virtual reality game and/or social networking site. As an example, in a social networking site, it may be desirable for the site designer to limit the chat, facial expressions, gestures and other activities within an area to ensure enjoyment for each of the members of the site and/or area. Conversely, the guest privileges may comprise the ability to perform some or all of the activities of the guest limitations.

The VRU system may, in addition to such limitations, or as an alternative to them, render avatars operated by guest in a recognizable way, such as by a floating icon, halo, altered coloration, or other visual effect. Other users may thereby be alerted to the fact that a particular avatar is not being operated by a member. The VRU system may also render a visual link or other visual cue to link the guest avatar to the avatar of the guest's host member.

At step 150, the system my determine whether the guest has violated any of the guest requirements. At step 160, the guest is notified of the violated guest requirements and that guest access may be terminated if a number of violations is reached. The guest may be moved within the area if the guest crosses outside of the area. Alternatively, the VRU may be configured such that the guest avatar cannot move outside the defined area. At step 170, it is determined whether the guest has violated the predetermined number of guest requirements. Steps 150, 160 and 170 may be repeated each time the guest violates a guest requirement. At step 170, access to the virtual reality game may be terminated if the guest is determined to have violated the predetermined number of guest requirements. The guest may also lose guest privileges.

FIG. 2 is a block diagram of a system 200 for guest management in an online multiplayer virtual reality game. In an aspect, the system 200 may comprise a Wide Area Network (WAN) 202, network host computer 204, a plurality of clients 206, a database server 208 and a database 210. The WAN may enable connectivity between the network host computer 204, the plurality of clients 206, the database server 208 and the database 210. The network host computer may comprise a guest management application 212, which may be encoded on computer-readable media and configured for performing the steps described herein. Alternatively, each of the plurality of clients 206 may comprise a guest management program 214, which may also be encoded on computer-readable media and configured for performing the steps described herein. In yet another alternative embodiment, some of the steps may be performed by the guest management application 212, while other steps are performed by the guest management program 214. The database server 208 and database 210 may be coupled to the network host computer 204 to store the database that is used in connection with the method. Alternatively, the database server 208 and/or database 210 may be connected to the WAN 202 and may be operable to be accessed by the network hose computer 204 via the WAN 202.

The plurality of clients 206 may further comprise an internal hard disk 216 for storing the guest management program 214, a processor 218 for executing the guest management program 214 and/or performing other background tasks and an internal bus 220 for internally connecting the hard disk 216 and the processor 218. The hard disk 216 may also be configured to store the database used in the method described herein. The notification of the guest requirements and termination of guest access may be displayed on the clients 206 via a web display 222.

Having thus described embodiments of a method and system for guest management in an online multi-player virtual reality game, it should be apparent to those skilled in the art that certain advantages of the within system have been achieved. It should also be appreciated that various modifications, adaptations, and alternative embodiments thereof may be made within the scope and spirit of the present invention. For example, a system operable over a wide area network has been illustrated, but it should be apparent that the inventive concepts described above would be equally applicable to systems operating over other networks.

What is claimed is:

1. A guest-management system in an online multiplayer virtual reality environment comprising:
   an interface component receiving a guest access request from a guest client and input data from a member client, the input data operative to control one or more avatars in a modeled virtual reality environment;
   a memory holding program instructions operable for:
      determining whether the guest client is sharing a user account with a member client;
      enabling control of a guest avatar's movements in the modeled virtual reality environment in response to input data from the guest client and limiting the guest avatar's movements relative to current locations of a member avatar controlled by the member client, based on determining that the guest client is sharing the user account with the member client; and
   a processor, in communication with the memory and the interface component, configured for operating the program instructions.

2. The guest-management system of claim 1, further comprising electronic records of guest access permits shared by respective member clients.

3. The guest-management system of claim 2, further comprising determining whether the guest client is sharing a user account with the member client based on whether the guest access request identifies at least one of the guest access permits.

4. The guest-management system of claim 1, further comprising receiving a guest access request for the guest client from the member client.

5. The guest-management system of claim 1, further comprising receiving a guest access request from the guest client.

6. The guest-management system of claim 1, wherein the restrictions further prevent the guest client from utilizing ancillary functions selected from the group consisting of chat, instant messaging, in-game mail, and avatar gestures and facial expressions.

7. A computer-implemented method for providing guest management in an online multiplayer virtual reality environment comprising:
controlling one or more avatars in a multi-user modeled virtual reality environment modeled in a computer memory, in response to input data;
receiving a guest access request for a guest client;
determining, using the computer server, whether the guest client is sharing a user account with a member client;
enabling control of a guest avatar's movements in the modeled virtual reality environment in response to input data from the guest client and limiting the guest avatar's movements relative to current locations of a member avatar controlled by the member client, based on determining that the guest client is sharing the user account with the member client.

8. The method of claim 7, wherein determining whether the guest client is sharing a user account with a member client comprises determining whether the member client is logged into the modeled virtual reality environment.

9. The method of claim 7, wherein limiting the guest avatar's movements restricts the guest avatar to movement within an area bounded by a defined perimeter around the member avatar.

10. The method of claim 9, further comprising restricting the guest avatar from moving outside the area.

11. The method of claim 9, further comprising continuously redefined the area based on the member avatar's movements in the modeled virtual reality environment.

12. The method of claim 11, further comprising maintaining the guest avatar within the area by moving the guest avatar without user input from the guest client.

13. The method of claim 7, further comprising determining a direction of movement of the member avatar.

14. The method of claim 13, further comprising limiting the guest avatar's movements based on the direction of movement of the member avatar.

15. The method of claim 14, further comprising limiting the guest avatar's movements within an area bounded by a predefined angle relative to the direction of movement of the member avatar.

16. A non-transitory computer-readable medium encoded with instructions operative to cause a computer to perform the steps of:
receiving input data at a host from multiple remote clients for coordinating a multi-user virtual reality process;
receiving a guest access request for a guest client;
determining whether the guest client is sharing a user account with a member client;
enabling control of a guest avatar's movements in the modeled virtual reality environment in response to input data from the guest client and limiting the guest avatar's movements relative to current locations of a member avatar controlled by the member client, based on determining that the guest client is sharing the user account with the member client.

17. The computer-readable medium of claim 16, further encoded with instructions operative to cause a computer to provide a notification to the guest client of a restriction on the guest avatar's movements.

18. The computer-readable medium of claim 17, further encoded with instructions operative to cause a computer to continuously provide information relating to the guest avatar's location relative to the member avatar.

19. The computer-readable medium of claim 17, further encoded with instructions operative to cause a computer to provide a warning to the guest client in response to user input directing the guest avatar to violate the restriction.

20. The computer-readable medium of claim 19, further encoded with instructions operative to cause a computer to determine whether user input directs the guest avatar to violate the restriction.

21. The computer-readable medium of claim 17, further encoded with instructions operative to cause a computer to notify the member client in response to user input directing the guest avatar to violate the restriction.

22. The computer-readable medium of claim 17, further encoded with instructions operative to cause a computer to count a number of times the guest avatar's movements violate the restriction.

23. The computer-readable medium of claim 22, further encoded with instructions operative to cause a computer to terminate the guest client's access if the number of violations exceeds a predetermined number.

* * * * *